United States Patent
Terada

(10) Patent No.: US 7,097,481 B2
(45) Date of Patent: Aug. 29, 2006

(54) SLACK ABSORBING DEVICE OF ELECTRIC WIRES

(75) Inventor: Tomoyasu Terada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/975,403

(22) Filed: Oct. 29, 2004

(65) Prior Publication Data

US 2005/0124212 A1    Jun. 9, 2005

(30) Foreign Application Priority Data

Dec. 9, 2003   (JP) .............................. 2003-409859

(51) Int. Cl.
*H01R 13/64*   (2006.01)
(52) U.S. Cl. ..................... 439/248; 439/447
(58) Field of Classification Search ............... 439/248, 439/447, 162, 501, 502; 174/69
See application file for complete search history.

(56) References Cited

U.S. PATENT DOCUMENTS 3,157,451 A * 11/1964 Martini ....................... 439/162

2006/0030174 A1 * 2/2006 Tsubaki et al. ............ 439/76.2

FOREIGN PATENT DOCUMENTS

| JP | 2-33516 | 3/1990 |
|---|---|---|
| JP | 09020189 A | 1/1997 |

* cited by examiner

*Primary Examiner*—Khiem Nguyen
(74) *Attorney, Agent, or Firm*—Armstrong, Kratz, Quintos, Hanson & Brooks, LLP

(57) ABSTRACT

The slack absorbing device of electric wires includes: electric wires for constituting a wiring harness; a casing that receives the electric wires and has an opening through which the electric wires are guided into and guided out from the casing; a biasing member that biases the electric wires in a direction in which the electric wires are drawn into the casing; and a device body having a harness winding member that is capable of reciprocating motion receiving bias force from the biasing member, wherein the electric wires guided into and guided out from the casing are covered with a protection tube for preventing the electric wires from being damaged, an end of the electric wires is provided with a connector to be connected to a mating wiring harness, an end of the protection tube is fixed to a connector case that is capable of receiving the connector.

6 Claims, 3 Drawing Sheets

SLACK ABSORBING DEVICE OF ELECTRIC WIRES

BACKGROUND OF THE INVENTION (1) Field of the Invention

The present invention relates to a slack absorbing device of electric wires to be mounted, for example, on a panel located in the vicinity of a trim provided on the rear side of a motor vehicle or on a luggage door, which device can absorb the slack of the electric wires that are repeatedly guided into and guided out from a casing.

(2) Description of the Related Art

FIG. 4 shows a cross sectional view illustrating a conventional electric wire device for use in a motor vehicle (for example, see Japanese Utility Model Application Laid-Open No. H2-33516).

Many electric wires 102 having connectors 103A and 103B at their ends are received in casing 111A and 111B formed in the longitudinal direction of the electric wires 102 and mounted in a vehicle. The connectors 103A and 103B are received and fixed in the casing 111A and 111B, respectively. Joint surfaces 113a and 113b of the connectors 103A and 103B are located at openings of the casing 111A and 111B, respectively. Each end of the casing 111A and 111B, at which the connectors 103A and 103B are received and fixed, are movable relatively to the mating casing 111B or 111A. When the connectors 103A and 103B are coupled with each other, the connectors 103A and 103B and the electric wires 102 are prevented from being exposed to the outside of the casing 111A and 111B, so that the connectors 103A and 103B and the electric wires 102 are prevented from being damaged. Further, by using such an electric wire device, the coupling of the connectors 103A and 103B is easily carried out.

In addition, as another conventional example, a clamp for fixing to a vehicle is fixed to a connector without using a casing for receiving and protecting electric wires, and the connector is mounted on the vehicle (not shown in the figure).

In the conventional electric wire device for use in a motor vehicle described above, the casing 111A and 111B indeed functions as protectors for preventing the connectors 103A and 103B and the electric wires 102 from being damaged. However, from motor vehicle parts assembly makers, demanded is a device that has an enhanced function and modularity so as to improve the workability in assembling compared to the conventional electric wire device.

As an example that has an enhanced function and modularity as described above, there is so-called a slack absorbing device of electric wires, which device can always absorb the slack of electric wires that are repeatedly guided into and guided out from a casing.

Recently, it has been required that the dimensional accuracy of the slack absorbing device of electric wires is improved. For example, in a case when the dimensional change in the electric wires situated in the slack absorbing device and in matters located in the vicinity of the electric wires occurs, the conventional slack absorbing device cannot absorb all of the dimensional changes in the electric wires situated in the slack absorbing device and in the matters located in the vicinity of the electric wires. Therefore, in a case when the dimensional change in each component that constitutes the conventional slack absorbing device occurs, it has been worried about that excessive force might be applied on the electric wires when the slack absorbing device is mounted on a vehicle, when the electric wires are guided out from the slack absorbing device or when the electric wires are guided into the slack absorbing device. Further, if things come to the worst, it has been worried about that the electric wires might be cut or that terminals connected to the electric wires might be damaged.

In a case when a clamp for fixing to a vehicle is fixed to a connector without using a casing for receiving electric wires and the connector is mounted on the vehicle with hands, it has been worried about that a part of the electric wires located in the vicinity of the connector might be bent, so that excessive force might be applied on the electric wires that constitute a wiring harness. Further, when the electric wires are assembled so as to be a flat harness, it has been worried about that the flat harness might be repeatedly bent so as to be broken.

SUMMARY OF THE INVENTION

It is therefore an objective of the present invention to solve the above problem and to provide a slack absorbing device of electric wires, by which the dimensional change can be absorbed even when the dimensional change of matters located around the electric wires occurs, and such a problem that due to the dimensional change, for example, excessive force is applied on the electric wires so as to break the electric wires is prevented from occurring.

In order to attain the above objective, the present invention is to provide a slack absorbing device of electric wires including:

electric wires for constituting a wiring harness;

a casing that receives the electric wires and has an opening through which the electric wires are guided into and guided out from the casing;

a biasing member that biases the electric wires in a direction in which the electric wires are drawn into the casing; and a device body having a harness winding member that is capable of reciprocating motion receiving bias force from the biasing member, wherein the electric wires guided into and guided out from the casing are covered with a protection tube for preventing the electric wires from being damaged, an end of the electric wires is provided with a connector to be connected to a mating wiring harness, an end of the protection tube is fixed to a connector case that is capable of receiving the connector, and the connector is movably received in the connector case.

With the construction described above, since the connector provided at the end of the electric wire is received movably in the connector case, the dimensional tolerance of the protection tube fixed to the connector case is absorbed. Accordingly, it can be avoided that the protection tube fixed to the connector case expands and contracts so that the dimension of the protection tube changes causing excessive force to be applied on the electric wires in the protection tube or causing the electric wires, which are connected to the connector in the connector case, to be broken. In addition, since a portion where the connector and the electric wires are connected is covered with the connector case, it can be avoided that bending at such a portion occurs. Therefore, the slack absorbing device of electric wires of the present invention secures the reliability of the connection.

Preferably, the protection tube is formed as a woven shield that is formed in one piece with the connector case.

With the construction described above, since the woven shield is formed in one piece with the connector case, the connector case is securely mounted on the woven shield without a gap therebetween.

Preferably, the connector is insertable into the connector case from the front of the connector case, and the connector case is provided with a stopper for preventing the connector from coming out from the connector case when the connector is received in the connector case.

With the construction described above, since the connector is insertable into the connector case from the front of the connector case, when the connector is mounted into the connector case so as to assemble the slack absorbing device of electric wires, the connector is easily mounted into the connector case. Further, since the connector case is provided with a stopper for preventing the connector from coming out from the connector case, the connector received in the connector case hardly comes out from the connector case.

Preferably, the stopper includes a flexible stopper arm that engages with a mating connector of a wiring harness of an opposite side.

With the construction described above, a mating connector of an opposite side can be easily mounted to or separated from the connector case. Therefore, a wiring harness on the side of the slack absorbing device can be easily coupled with or separated from a wiring harness of an opposite side.

DESCRIPTION OF THE PREFERRED EMBODIMENTS

In the following, a preferred embodiment of the slack absorbing device of electric wires according to the present invention will be explained in detail with reference to the attached drawings.

Figure 1:
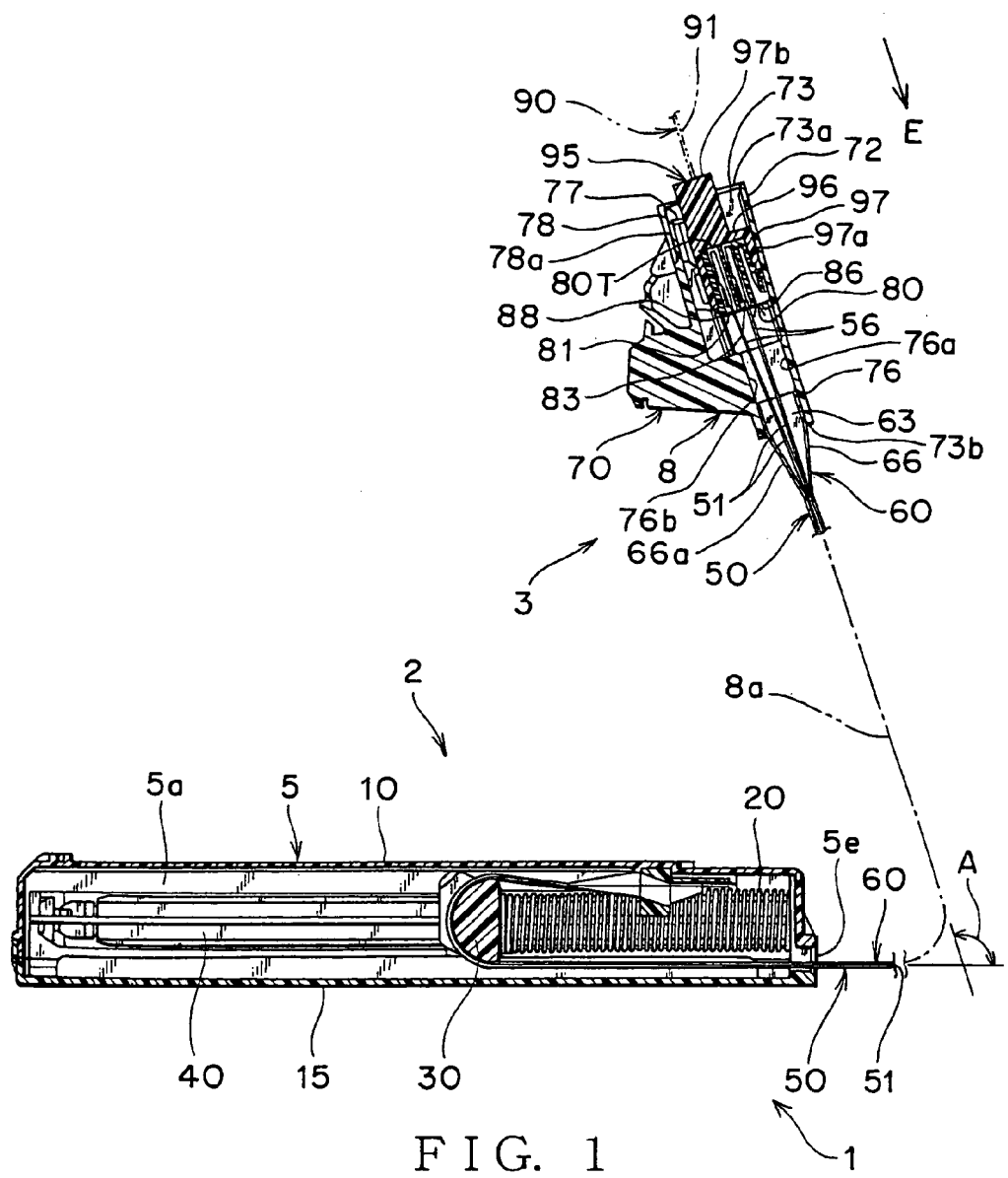
FIG. 1 is a cross sectional view illustrating a preferred embodiment of a slack absorbing device of electric wires according to the present invention.
Figure 4:
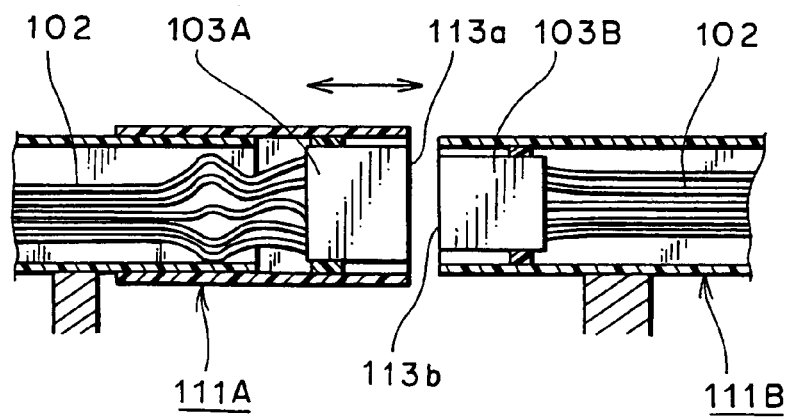
FIG. 4 is a cross sectional view of a conventional electric wire device for use in a motor vehicle.
Figure 2:
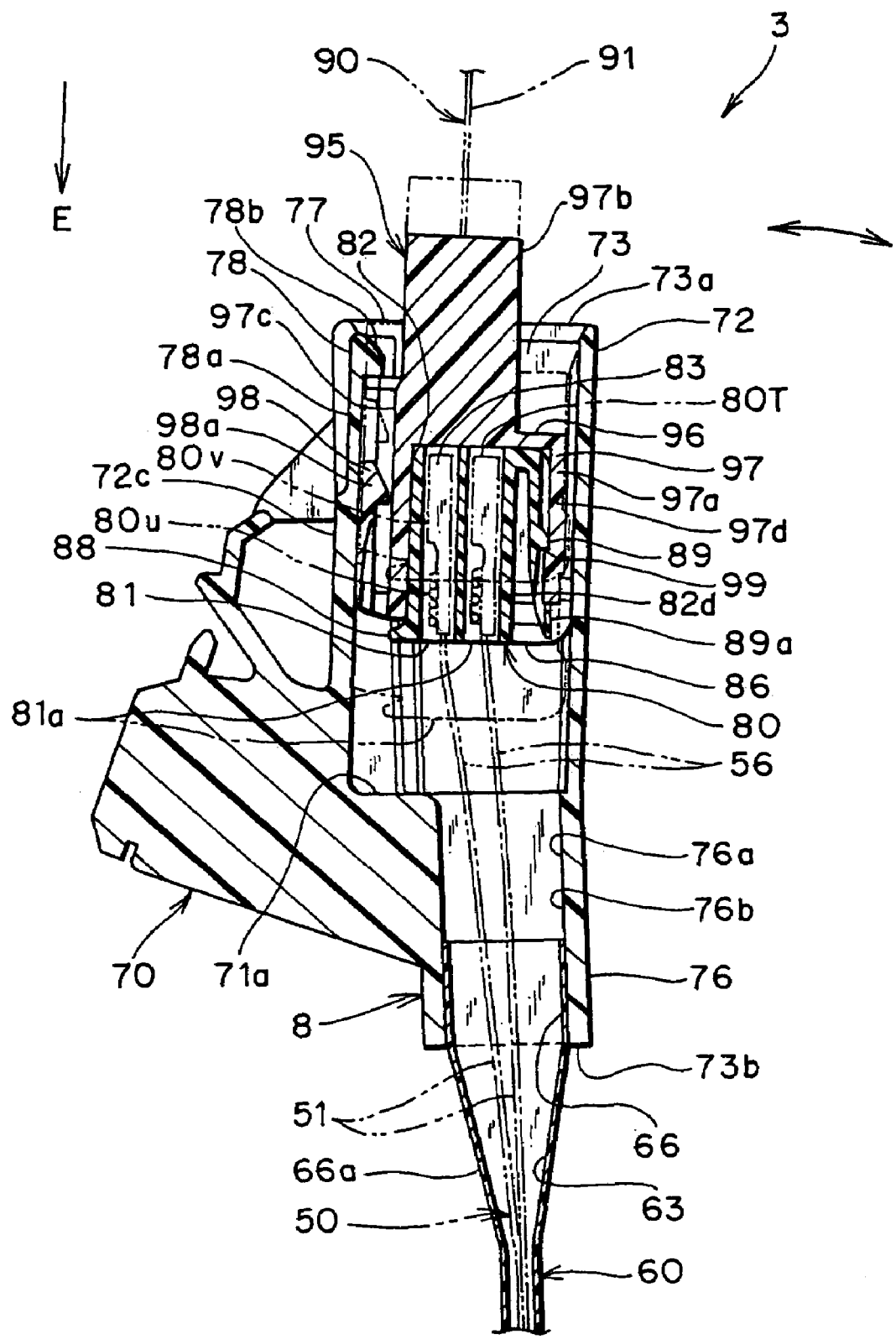
FIG. 2 is an enlarged cross sectional view illustrating a connection part of the slack absorbing device of electric wires.
Figure 3:
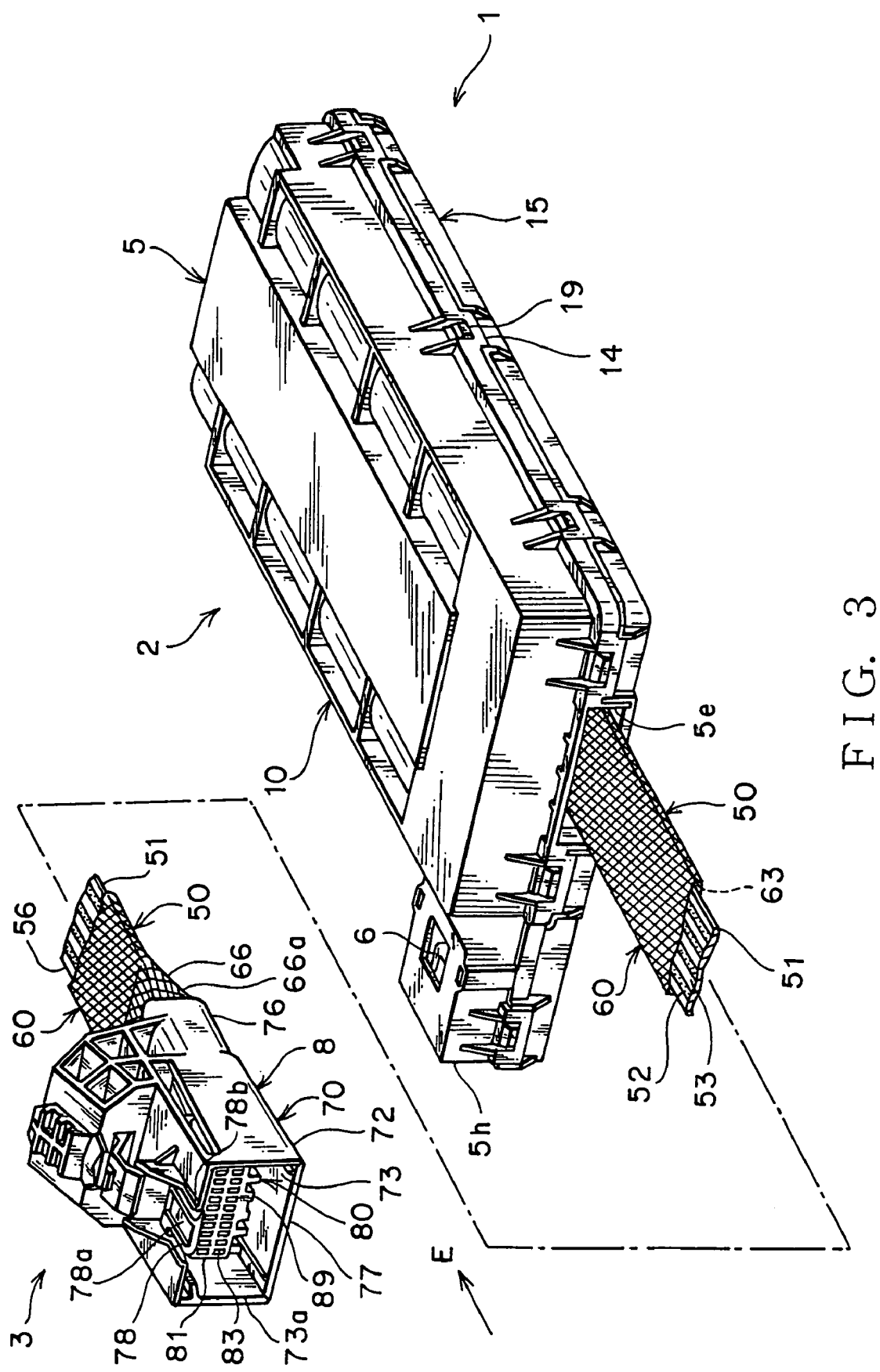
FIG. 3 is a perspective view illustrating the slack absorbing device of electric wires.

FIG. 1 is a cross sectional view illustrating a preferred embodiment of a slack absorbing device of electric wires according to the present invention. FIG. 2 is an enlarged cross sectional view illustrating a connection part of the slack absorbing device of electric wires. FIG. 3 is a perspective view illustrating the slack absorbing device of electric wires.

As shown in FIG. 1, the slack absorbing device 1 of electric wires includes a device body 2 for absorbing slack of the electric wires 51 that constitute a wiring harness 50 and a connection part 3, which is provided at an end 56 of the wires 51 to be guided out from the device body 2 and electrically connected to a wiring harness of an opposite side.

The device body 2 includes: the wires 51; a rectangular shape-casing 5 made of synthetic resin, which receives the wires 51 and includes an opening 5e through which the wires 51 are guided into or guided out; a biasing member 20 made of metal, which biases the electric wires 51 in a direction in which the electric wires 51 are drawn into the casing 5; a harness winding member 30 made of synthetic resin, which is capable of reciprocating motion receiving bias force from the biasing member 20; and a guide pin 40 made of synthetic resin, which guides the biasing member 20 keeping the biasing member 20 in its proper posture when the biasing member 20 expands and contracts in the longitudinal direction of the casing 5. The biasing member 20 is a compression coil spring 20 made of metal, which generates restoring resilient force due to the compression thereof. A connector 6 connected to the wires 51 is received in a small rectangular box-shaped holder 5h provided in the casing 5 (FIG. 3).

As shown in FIGS. 1 and 3, the casing 5 includes an upper box body 10 made of synthetic resin and a cover 15 made of synthetic resin to be mounted to the lower side of the box body 10. As shown in FIG. 3, each engaging part 14 formed on the box body 10 is engaged with a corresponding engaging part 19 formed on the cover 15, thereby constructing the casing 5. The casing 5 also has a function as a protector for protecting the wires 51 in a protection tube 60 (FIGS. 1 and 3), which wires are wound into a receiving chamber 5a (FIG. 1) through the opening 5e of the casing 5, from the outside. The wires 51 are repeatedly guided into and guided out from the casing 5.

As described above, the box body 10 constructing the casing 5 is located at the upper side while the cover 15 constructing the casing 5 is located at the lower side. However, the definition of the "upper and lower" in the specification is only for the sake of convenience in the explanation and therefore, it may not be coincide with an actual direction when the slack absorbing device 1 is practically used. When the wires 51 are repeatedly guided into and guided out from the casing 5, if the slack absorbing device 1 is made capable of always absorbing the slack of the wires 51, a mounting of the device body 2 and the connection part 3 can be carried out in any direction.

The connection part 3 includes; a connector 80 made of synthetic resin, which is provided at the end 56 of the wires 51 to be guided out from the device body 2 (FIG. 1) and is to be coupled with a mating connector 95 made of synthetic resin situated in a wiring harness 90 (FIGS. 1 and 2) of an opposite side; and a connector case 70 made of synthetic resin, which receives the connector 80. The connector case 70 functions as a holder 70 for receiving the connector 80.

The wires 51 that are guided into or guided out through the opening 5e of the casing 5 are covered with a protection tube 60 for preventing the wires 51 from being damaged. An end 56 of the wires 51 is provided with a connector 80 (FIGS. 1–3) to be electrically connected to a mating connector 95 of a wiring harness 90 of an opposite side. An end 66 of the protection tube 60 is fixed to a rear end 76 of the connector case 70. As shown in FIG. 2, the connector 80 is movably received in a receiving room 73 of the connector case 70. That is, the connector 80 is slidable in the receiving room 73.

Since the connector 80 provided at the end 56 of the wires 51 is movably received in a receiving room 73 of the connector case 70, the dimensional tolerance of the protection tube 60 fixed to the rear end 76 of the connector case 70 is absorbed. Further, it is avoided that the total length of the protection tube 60 expands and contracts so as to change the total dimension of the protection tube 60 so that excessive force is applied to the wires 51 situated in the protection tube 60. Accordingly, it can be avoided that the protection tube 60 fixed to the rear end 76 of the connector case 70 expands and contracts so that the dimension of the protection tube 60 changes causing excessive force to be applied on the electric wires 51 in the protection tube 60 or causing the electric wires 51, which are connected to the connector 80 in the receiving room 73 of the connector case 70, to be broken.

In addition, since a portion where the connector 80 and the electric wires 51 are connected is covered with the connector case 70, it can be avoided that bending at such a portion occurs. The connector case 70 functions as a cover for protecting the portion where the connector 80 and the electric wires 51 are connected.

As shown in FIG. 2, the portion where the connector 80 and the electric wires 51 are connected is an electric wire connection part 80u of a terminal 80T where the terminal 80T received in a receiving room 83 of a connector housing 81 that constitutes the connector 80 is connected to the wires 51. Since the connection part 80u is covered with the connector 80 and the connector case 70, therefore it is avoided that excessive force is applied to the connection part 80u when the excessive force is applied to the end 56 of the wires 51 so that connection part 80u undergoes bending or deformation.

The end 56 of the wires 51 is a portion where the connector 80 is connected to the wires 51. If the end 56 is covered with the connector case 70, it is avoided that the wires 51 is significantly bent in the vicinity of the end 56 when excessive force is applied to the end 56 of the wires 51 causing the wires 51 to have a bent part. If the end 56 is covered with the connector case 70, the end 56 of the wires 51 is moderately bent along the inside of a swelling portion 66a formed near to an end 66 of the protection tube 60. Further, if the wires 51 are formed as a flexible flat cable 51, it is avoided that conductors 52 (FIG. 3) are broken due to repeated bending thereof.

Thus, since the connector 80 (FIGS. 1 and 2) and the end 56 of the wires 51 to be connected to the connector 80 are covered with the connector case 70, the slack absorbing device 1 of electric wires secures the reliability of the connection.

The protection tube 60 (FIG. 3) is formed as a woven shield 60. When the connector case 70 (FIGS. 1–3) made of synthetic resin is formed by injection molding process, an end 66 of the woven shield 60 is formed in one piece with the rear end 76 of the connector case 70. As shown in FIG. 2, the end 66 of the woven shield 60 is formed in one piece with the connector case 70 on the inside 76a of an opening 73b formed at the rear end 76 of the connector case 70. That is, the end 66 of the woven shield 60 is formed in one piece with the connector case 70 along an inner side 76b of the inside 76a of the opening 73b. Thereby, the swelling portion 66a, which corresponds to the inside 76a of the opening 73b, is formed near to the end 66 of the woven shield 60. Since the protection tube 60 is molded in one piece with the connector case 70, a tube mold 8, in which the protection tube 60 is formed in one piece with the connector case 70, is constructed. The connector case 70 is made as a tube holder 70 formed in one piece with the protection tube 60.

Since the end 66 of the woven shield 60 is in one piece with the rear end 76 of the holder 70, the holder is securely mounted on the woven shield 60 without a gap therebetween. Thus, the woven shield 60 is formed in one piece with the holder 70, thereby constructing the tube mold 8. The wires 51 are covered with and protected by the woven shield 60 that constructs the tube mold 8. A slack 8a (FIG. 1) of the woven shield 60, which includes the wires 51 in the inside 63, is exposed to the outside of the casing 5.

If the end 66 of the woven shield 60 is formed in one piece with the rear end 76 of the holder 70 simultaneously when the holder 70 is formed by injection molding by using synthetic resin as the material, it is not needed to provide an additional member (not shown in the figure) for fixing the woven shield 60 to the holder 70.

Further, since the end 66 of the woven shield 60 is formed in one piece with the rear end 76 of the holder 70, it is not needed to use an adhesive to fix the woven shield 60 to the holder 70.

However, depending on a design specification of the slack absorbing device 1 of electric wires, the above-mentioned additional member for fixing the woven shield 60 to the holder 70 may be used or, alternatively, the above-mentioned adhesive may be used to fix the woven shield 60 to the holder 70. Depending on a design specification of the slack absorbing device 1, various measures may be used to fix the woven shield 60 to the holder 70.

The woven shield 60 is formed in a net-shape being made of synthetic resin. In detail, for example, the woven shield is formed by weaving thread made of polyethylene terephthalate (PET) having a diameter of 0.23 mm in a hollow band-shape. The polyethylene terephthalate is a suitable material for a woven shield because of its excellent properties in dimensional stability, strength, sliding characteristic, heat resistance, and electric property.

A flat harness, which is thin and flexible, may be used as the electric wires 51. The flat harness is, for example, a circuit body having ribbon electric wires of round conductors, flexible flat cable, or flexible printed circuit.

A flexible flat cable (FFC) 51 is formed by arranging a plurality of circuit conductors 52 on an electrically insulating sheet 53. The circuit conductor 52 may be, for example, a thin strip, thin wire or enameled wire. The insulating sheet 53 may be, for example, a film made of polyethylene terephthalate (PET) having excellent properties in dimensional stability, strength, sliding characteristic, heat resistance, and electric property.

The flexible printed circuit (FPC) is formed by arranging and printing a plurality of circuit conductors, which are formed with a metal foil such as a copper foil, on an electrically insulating sheet followed by providing a protection layer thereon.

When a luggage door (not shown in the figure) of a motor vehicle is opened or closed, the flexible flat cable 51 covered with the woven shield 60 is guided into or guided out through the opening 5e of the device body 2, at that time the flexible flat cable 51 rubs against the woven shield 60 at the inside 63 of the woven shield 60.

The holder 70, which is formed in one piece with the woven shield 60, box body 10, which constructs the protector 5 for the device body 2, and the cover 15 are made of synthetic resin including at least one of polypropylene (PP) and polyethylene (PE), which are thermoplastic synthetic resin suitable to injection molding for mass production.

A molded body formed by using polyethylene has excellent moldability and electrically insulating property. A molded body formed by using polypropylene also has excellent electrically insulating property. A molded body formed by using polypropylene has better surface gloss, therefore better appearance than a molded body formed by using polyethylene. A molded body formed by using polypropylene has a large stiffness, therefore reduced stress-cracking. A molded body formed by using polypropylene has an excellent resistance against repeated bending stresses. Accordingly, a molded body which needs good flexibility, for example, a molded body to be applied to an engaging part having flexible arm portion is preferably formed by using polypropylene.

As shown in FIG. 2, the connector 80 has such a size that it can be inserted into the receiving room 73 of the holder 70 from the opening 73a located on the front side 77 of the holder 70. When the connector 80 is received in the receiving room 73 of the holder 70, a front side 77 of a circumferential wall 72 of the holder 70 is provided with a stopper 78 for preventing the connector 80 from coming out from the receiving room 73 of the holder 70. Corresponding to the stopper 78, a rear end 86 of the connector 80 is provided with a stopper part 88. The stopper part 88 is formed as a projection 88 extending in a direction crossing at right angles with the insertion direction E of the connector 80.

Since the connector 80 has such a size that it can be inserted into the receiving room 73 of the holder 70 from the opening 73a located on the front side 77 of the holder 70, when the connector 80 is mounted to the holder 70 so as to assemble the slack absorbing device 1, the connector 80 can be easily mounted to the holder 70. Further, since the front side 77 of the circumferential wall 72 of the holder 70 is provided with the stopper 78 for preventing the connector 80 from coming out from the receiving room 73, it can be avoided that the connector 80 received in the receiving room 73 abruptly comes out to the outside of the holder 70. Thus, the connector 80, which is received movably in the receiving room 73 of the holder 70, hardly comes out from the receiving room 73 of the holder 70.

A connector housing 81, which constructs the connector 80, is provided with a stopper portion 89. Corresponding to the stopper portion 89, a connector housing 96, which constructs a mating connector 95 of an opposite side, is provided with an engaging part 99. The stopper portion 89 engages with the engaging part 99, thereby the connector 80 is securely connected to the mating connector 95.

As shown in FIG. 2, a terminal 80T is received in the receiving room 83 of the connector housing 81. The terminal 80T is formed as a piercing terminal 80T that electrically connects the terminal 80T to the wires 51 by piercing it into the flat wires 51. The wire connection part 80u of the piercing terminal 80T is pierced into and penetrated through the flexible flat cable 51 and thereafter, the wire connection part 80u is bent and caulked to the flexible flat cable 51, thereby the circuit conductors 52 (FIG. 3) of the flexible flat cable 51 is electrically connected to the wire connection part 80u of the piercing terminal 80T (FIG. 2). Further, the connector housing 96 of the mating connector 95 receives a mating terminal (not shown in the figure) to be electrically in contact with the piercing terminal 80T.

The stopper portion 89, which has a flexible arm 89a situated on the side of a lower wall 82d of a circumferential wall 82 of the connector 80 received in the receiving room 73 of the holder 70, is engaged with the engaging part 99, which is provided on the side of the front half 97a and on the side of a lower wall 97d of a circumferential wall 97 of the connector housing 96 of the mating connector 95, thereby the connector 80 is securely connected to the mating connector 95.

At that time, a tab-shaped male terminal (not shown in the figure) of the mating connector 95 is inserted into an electric contact 80v of the female terminal 80T formed in a rectangular box-shape, thereby the female terminal 80T electrically comes in contact with the male terminal. Thus, the connector 80 received in the holder 70 is electrically connected to the mating connector 95.

The stopper 78 formed on the side of the front 77 of the circumferential wall 72 of the holder 70 (FIGS. 2 and 3) is engaged with an engaging part 98 formed on the side of the front half 97a of the mating connector 95 of a wiring harness 90 (FIG. 2) of an opposite side. The stopper 78 of the holder 70 is formed as a stopper 78 having a projection 78b, which is easily engaged with the engaging part 98 of the mating connector 95. In the mating connector 95, on the side of the front half 97a of the circumferential wall 97 of the connector housing 96, there is provided the rectangular frame-shaped engaging part 98, which is engaged with the projection 78b of the stopper 78 having a flexible stopper arm 78a.

The flexible stopper arm 78a formed on the side of the front 77 and on the side of the upper wall 72c of the circumferential wall 72 of the holder 70 (FIG. 2) climbs over an engaging frame 98a, which is provided on the side of the front half 97a and on the side of an upper wall 97c of the circumferential wall 97 of the connector housing 96 of the mating connector 95, thereby the holder 70 is engaged with the mating connector 95. Thereby, the mating connector 95 connected to the holder 70 is set movable relatively to the holder 70 keeping the connection with the holder 70.

When the holder 70 is to be separated from the mating connector 95, the flexible stopper arm 78a of the stopper 78 is bent in a direction of releasing, thereby the projection 78b of the holder 70 is removed from the frame-shaped engaging part 98 of the mating connector 95. The flexible arm 89a of the connector 80, which has been received in the receiving room 73 of the holder 70, is bent in a direction of releasing, thereby the connector 80 is separated from the mating connector 95.

Since the stopper 78 includes the projection 78b, which is easily engaged with the frame-shaped engaging part 98, and the flexible stopper arm 78a, which is bent in the direction of releasing upon releasing, therefore the mounting or removing of the mating connector 95 with respect to the holder 70 can be carried out easily and smoothly. Accordingly, the mounting or removing of a wiring harness of an opposite side, which is electrically connected to the wiring harness 50 on the side of the slack absorbing device 1 of electric wires, with respect to the wiring harness 50 can be carried out easily and smoothly.

The slack absorbing device 1 of electric wires shown in FIG. 1 is in a state when the luggage door (not shown in the figure) is fully opened with respect to a body (not shown) of a motor vehicle. In a state when the luggage door is closed with respect to the body, the connection part 3 shown in FIG. 1 is rotated by an angle A of about 110°, while the flexible flat cable 51 and the slack 8a of the tube mold 8 are received in the receiving chamber 5a of the protector 5, and the connector insertion direction E of the connection part 3 becomes approximately in parallel with the device body 2 of the slack absorbing device 1. When the luggage door is fully opened again with respect to the body, the connection part 3 is positioned again in the state as shown in FIG. 1 with respect to the device body 2.

When the luggage door is opened with respect to the vehicle body, the connection part 3 is pulled relatively to the device body 2 of the slack absorbing device 1. At that time, in order to avoid that excessive force is applied on the flexible flat cable 51, an inner wall 71a (FIG. 2) in the holder 70 is prevented from abutting against a rear end wall 81a of a connector housing 81, which faces the inner wall 71a in the holder 70.

Thus, since the tension occurring when the luggage door is opened with respect to the vehicle body is applied on the tube mold 8, which is constructed with the woven shield 60 and the holder 70 being formed in one piece, therefore it is securely avoided that the tension is applied on the flexible flat cable 51.

Since excessive force is not applied on the flexible flat cable 51, it can be avoided that excessive force is applied on the end 56 of the flexible flat cable 51 and on the connected terminal 80T so that the terminal 80T is deformed. It can be avoided that the terminal 80T is abruptly comes out from the receiving room 83 of the connector housing 81 of the connector 80.

Thus, the slack absorbing device 1 has an enhanced function and modularity so as to improve the workability in assembling. Further, with the slack absorbing device 1, it can be avoided that the flexible flat cable 51 is significantly bent or broken and also avoided that the terminal 80T in the connector 80 is damaged or comes out.

When the luggage door of a motor vehicle is fully opened, the woven shield 60 that includes the electric wires 51 therein is most extended. At that time, the maximum tension is applied on the woven shield 60.

A dimensional change of the woven shield 60 was measured by applying a load of 30 N on the woven shield 60. As a result, the amount of the dimensional change of the total length of the woven shield 60 was about several millimeters.

When the slack absorbing device 1 of electric wires shown in FIG. 1 is used, the device body 2 of the slack absorbing device 1 is mounted on a panel (not shown in the figure) in the vicinity of a trim provided at the rear side of a motor vehicle, while the connection part 3 is mounted on a luggage door of the motor vehicle. Electric wires 91 extending from the rear half 97b of a mating connector 95 of a wiring harness 90 (FIGS. 1 and 2) of an opposite side are connected to an electronic component such as a rear combination lamp (not shown) or rear window wiper (not shown), which is mounted on a luggage door of the motor vehicle.

The slack absorbing device 1 of electric wires according to the present invention is not limited by those shown in FIGS. 1–3. That is, the aforementioned preferred embodiments are described to aid in understanding the present invention and variations may be made by one skilled in the art without departing from the spirit and scope of the present invention.

What is claimed is:

1. A slack absorbing device of electric wires comprising: electric wires for constituting a wiring harness; a casing that receives the electric wires and has an opening through which the electric wires are guided into and guided out from the casing; a biasing member that biases the electric wires in a direction in which the electric wires are drawn into the casing; and a device body having a harness winding member that is capable of reciprocating motion receiving bias force from the biasing member, wherein the electric wires guided into and guided out from the casing are covered with a protection tube for preventing the electric wires from being damaged, an end of the electric wires is provided with a connector to be connected to a mating wiring harness, an end of the protection tube is fixed to a connector case that is capable of receiving the connector, and the connector is movably received in the connector case.

2. A slack absorbing device of electric wires comprising:
    electric wires for constituting a wiring harness;
    a casing that receives the electric wires and has an opening through which the electric wires are guided into and guided out from the casing;
    a biasing member that biases the electric wires in a direction in which the electric wires are drawn into the casing; and
    a device body having a harness winding member that is capable of reciprocating motion receiving bias force from the biasing member,
    wherein the electric wires guided into and guided out from the casing are covered with a protection tube for preventing the electric wires from being damaged, an end of he electric wires is provided with a connector to be connected to a mating wiring harness, an end of the protection tube is fixed to a connector case that is capable of receiving the connector, and the connector is movably received in the connector case; and
    wherein the protection tube is formed as a woven shield that is formed in one piece with the connector case.

3. The device according to claim 1, wherein the connector is insertable into the connector case from the front of the connector case, and the connector case is provided with a stopper for preventing the connector from coming out from the connector case when the connector is received in the connector case.

4. The device according to claim 2, wherein the connector is insertable into the connector case from the front of the connector case, and the connector case is provided with a stopper for preventing the connector from coming out from the connector case when the connector is received in the connector case.

5. The device according to claim 3, wherein the stopper includes a flexible stopper arm that engages with a mating connector of a wiring harness of an opposite side.

6. The device according to claim 4, wherein the stopper includes a flexible stopper arm that engages with a mating connector of a wiring harness of an opposite side.

* * * * *